United States Patent [19]

Nelson

[11] 4,074,473
[45] Feb. 21, 1978

[54] CONTROLLED THERMAL EXPANSIVITY STRUCTURE

[75] Inventor: Paul T. Nelson, Rolling Hills Estates, Calif.

[73] Assignee: TRW Inc., Redondo Beach, Calif.

[21] Appl. No.: 537,980

[22] Filed: Jan. 2, 1975

[51] Int. Cl.² .............................................. E04C 3/00
[52] U.S. Cl. ........................................ 52/1; 52/573; 52/726; 58/133; 73/363.1; 403/29
[58] Field of Search ............... 52/1, 573, 726; 58/133; 165/81; 403/28–30

[56] References Cited

U.S. PATENT DOCUMENTS

| 334,958 | 1/1886 | Mahony | 58/133 |
|---|---|---|---|
| 3,049,194 | 8/1962 | Brendel | 52/1 |
| 3,077,958 | 2/1963 | Grimsley | 52/573 X |
| 3,201,076 | 8/1965 | Deleuze | 52/301 X |
| 3,203,141 | 8/1965 | Musser | 52/1 |
| 3,229,224 | 1/1966 | Waly et al. | 331/94.5 |
| 3,411,360 | 11/1968 | Denner | 73/362.5 |
| 3,412,551 | 11/1968 | Swinzow | 73/363.1 X |
| 3,468,080 | 9/1969 | Hansen | 52/1 |
| 3,528,206 | 9/1970 | Baird | 52/1 |
| 3,675,376 | 7/1972 | Belew | 52/1 |

FOREIGN PATENT DOCUMENTS

| 782,913 | 3/1935 | France | 52/573 |
|---|---|---|---|
| 897,227 | 7/1949 | Germany | 58/133 |
| 640,892 | 8/1962 | Italy | 52/573 |
| 776,843 | 6/1957 | United Kingdom | 52/1 |

Primary Examiner—Price C. Faw, Jr.
Assistant Examiner—Leslie Braun
Attorney, Agent, or Firm—Donald R. Nyhagen; Daniel T. Anderson; Jerry A. Dinardo

[57] ABSTRACT

A controlled thermal expansivity structure whose length along a given axis of the structure and thermal expansivity in the direction of the axis, i.e. total change in length in response to a given temperature change, are independently adjustable in a manner which permits adjustment of the structure in length while maintaining its thermal expansivity constant and adjustment of the thermal expansivity of the structure while maintaining its length constant. The range of thermal expansivity adjustment may include zero expansivity to permit adjustment of the structure to dimensionally stable mode. The described structure is a load-bearing strut with end fittings which are adjustable to vary the length and thermal expansivity of the strut.

10 Claims, 2 Drawing Figures

CONTROLLED THERMAL EXPANSIVITY STRUCTURE

BACKGROUND OF THE INVENTION

1. Field of the Invention:

This invention relates generally to structures having controlled thermal expansivity, that is a controlled dimensional change in response to temperature change. More particularly, the invention relates to such a structure whose linear thermal expansivity along a given axis is adjustable through a range which may include zero expansivity and whose thermal expansivity and overall length along the axis are adjustable independently of one another.

2. Prior Art:

Many mechanical structures for use in a thermal environment whose temperature varies over a substantial range are required to have a controlled thermal expansivity. Most structures of this kind, for example, are designed to have essentially zero thermal expansivity so as to undergo little, if any, dimensional change in response to changing temperature. A structure having such zero or near zero expansivity is commonly referred to as a dimensionally stable structure. Examples of such dimensionally stable structures are found in U.S. Pat. Nos.:
 1,987,372
 3,077,958
 3,201,076
 3,229,224
 3,412,551
 3,468,080
 3,528,206
 3,675,376

SUMMARY OF THE INVENTION

This invention provides a controlled thermal expansivity structure whose thermal expansivity in the direction of a given axis of the structure, referred to herein as its controlled expansivity axis, or simply its axis, is adjustable through a range which may include zero expansivity and whose thermal expansivity and length along the axis are adjustable independently of one another.

The structure has at least one thermal expansivity control means including three elongate members joined end to end in parallel relation to the controlled expansivity axis with one member, referred to as the intermediate member, situated between the two remaining members which are referred to as end members. The adjacent members are joined by connecting means which secure the respective members against relative endwise thermal expansion and contraction at planes, referred to as connection planes, passing through the connecting means transverse to the axis. The connection plane of one end member and the intermediate member is fixed relative to the end member. The connection plane of the intermediate member and the other end member is fixed relative to the intermediate member. This latter end member and the intermediate member are the expansivity control members of the expansivity control means.

Each end member extends from its respective connection plane toward the other connection plane, that is from the end of the intermediate to which the end member is joined toward the opposite end of the intermediate member. Accordingly, the three members form an essentially S-shaped thermally responsive structure. The intermediate member has an effective length equal to its length between its two connection planes. Each end member has an effective length equal to its length between its respective connection plane and its opposite or other end.

Endwise thermal expansion and contraction of the two end members and of the intermediate member of the S-shape thermally responsive structure have opposite effects on the overall length of the structure. Thus, thermal expansion of the two end members tends to increase the overall length of the structure whereas thermal expansion of the intermediate member tends to reduce the overall length. Similarly, thermal contraction of the two end members tends to reduce the overall length while thermal contraction of the intermediate member tends to increase the overall length. The net change in the overall length of the structure, that is the thermal expansivity of the structure, is thus equal to the difference between the sum of the thermal length changes of the two end members and the thermal length change of the intermediate member. The thermal length changes of the members, in turn, equals the product of their effective length and their thermal coefficients of expansion.

According to the present invention, the connecting means of the expansivity control means are constructed to permit relative endwise adjustment of the two end members and intermediate member for adjusting the effective lengths of the two expansivity control members, i.e. the intermediate member and the end member whose connection plane is fixed relative to the intermediate member. Also these two expansivity control members are constructed of materials having differing thermal coefficients of expansion, such that adjustment of the members to vary the effective lengths of the control members varies the thermal expansivity of the controlled expansivity structure. The range of thermal expansivity adjustment may include zero expansivity by selection of proper materials for the members, whereby the expansivity control means may be adjusted to render the structure dimensinally stable. The members are also adjustable to vary the overall length of the structure. According to a feature of the invention, the overall length of the structure and its thermal expansivity are adjustable independently of one another, such that the length may be varied while retaining the expansivity constant and the expansivity may be varied while retaining the length constant.

The particular controlled expansivity structure described is a load-bearing strut. The strut has a pair of end fittings which are adjustable to vary the length and thermal expansivity of the strut. The thermal expansivity of the strut may be adjusted to essentially zero to render the strut dimensionally stable in a changing thermal environment.

DESCRIPTION OF THE PREFERRED EMBODIMENTS

Figure 1:
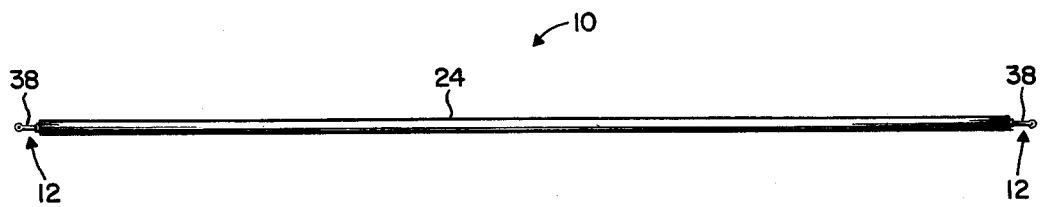
FIG. 1 illustrates a controlled thermal expansivity structure according to the invention.

Referring first to FIG. 1, there is illustrated a controlled thermal expansivity structure 10 according to the invention including two thermal expansivity control means 12. The particular structure shown is a load-bearing strut for supporting tension and compression loads. The expansivity control means 12 of the strut comprises end fittings having aperatured members for attachment to other members of a load-bearing structure. The primary novelty of the invention resides in the unique construction and arrangement of the expansivity control means or end fittings 12 which are adjustable to vary, independently of one another, the length of the strut and its longitudinal thermal expansivity. Being independently adjustable, the length of the strut may be adjusted without affecting its thermal expansivity and, conversely, the expansivity of the strut may be adjusted without affecting its length. The range of expansivity adjustment may include zero expansivity to permit adjustment of the strut to a dimensionally stable condition wherein the length of the strut remains constant in a thermal environment whose temperature fluctuates.

The expansivity control means or end fittings 12 of the strut 10 are essentially identical except in certain minor respects explained below. Accordingly, a description of one end fitting will suffice for both. With this in mind, the end fittings will be described in detail by reference to FIG. 2.

Figure 2:
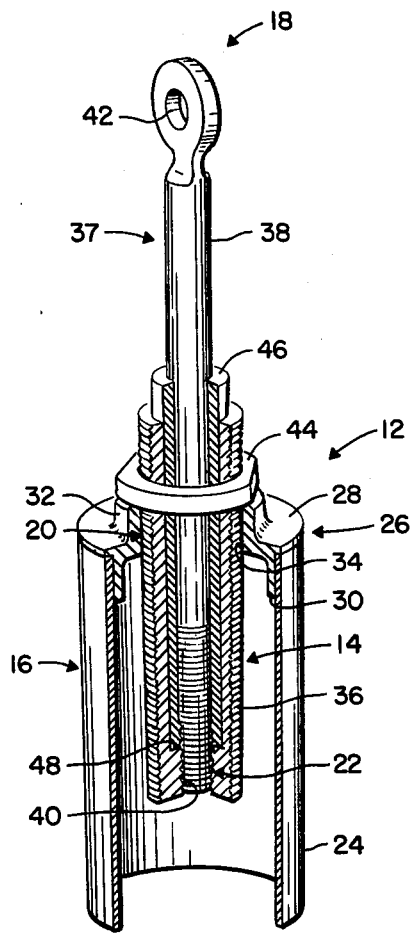
FIG. 2 is an enlarged perspective view, partially sectioned, of a thermal expansivity control means embodied in the structure.

In general terms, each thermal expansivity control means or fitting 12 comprises three elongate members 14, 16, and 18 joined end to end in parallel relation to the strut 10. This axis is the controlled thermal expansivity axis of the strut. Member 14 is located between members 16 and 18 and is referred to as the intermediate member. Members 16 and 18 are referred to as end members. At this point, attention is directed to the fact that the upper and lower ends of the members in FIG. 2 are their outer and inner ends in the strut of FIG. 1. For this reason the upper and lower member ends in FIG. 2 will be referred to as their outer and inner ends in the following description.

Members 14, 16, and 18 are joined end to end by connecting means 20 and 22 in such a way as to form an essentially S-shaped thermally responsive structure. Thus, end member 16 is joined at its outer end to the outer end of the intermediate member 14 by connecting means 20 and extends toward the inner end of the intermediate member. End member 18 is joined at its inner end to the inner end of the intermediate member by connecting means 22 and extends toward the outer end of the intermediate member.

Connecting means 20 and 22 secure their adjacent members against relative endwise thermal expansion and contraction at planes passing through the respective connecting means transverse to the longitudinal axis of controlled thermal expansivity of the strut 10. These planes are referred to herein as connection planes, the connection plane passing through the connecting means 20 being the outer connection plane and the connection plane passing through the connecting means 22 being the inner connection plane. The outer connection plane is fixed relative to the inner end member 16. The inner connection plane is fixed relative to the intermediate member 14.

The intermediate member 14 has an effective length equal to its length between the inner and outer connection planes. End member 16 has an effective length equal to its length between its inner end and the outer connection plane. End member 18 has an effective length equal to its length between its outer end and the inner connection plane. The expansivity control means or end fitting 12 has an overall length measured between the inner end of member 16 and the outer end of member 18.

From the description to this point, it will be understood that thermal expansion and contraction of the two end members 16 and 18, and of the intermediate member 14 have opposite effects on the overall length of the expansivity control means 12. Thus, thermal expansion of the end members tends to decrease the overall length. The opposite occurs during thermal contraction of the members. The net change in length of the control members, i.e. the expansivity of the control means, equals the summation of the length changes of the three members. As explained below, the members are constructed to have differing thermal coefficients, and the connecting means 20 are adjustable to vary the effective lengths of the intermediate member 14 and end member 18 in such a way as to permit adjustment of the thermal expansivity of the control means 12 through a range which may include zero expansivity and independent adjustment of the overall length and thermal expansivity of the control means 12 and thereby also the strut 10.

Referring now in more detail to the drawings, the inner end member 16 of the strut expansivity control means or end fittings 12 comprises a thin-walled tube 24 which forms the main body of the strut 10. Rigidly fixed to the end of the tube is a collar 26 having a circular shoulder 28 which seats against the end of the tube and a coaxial cylindrical flange 30 projecting into the tube. Flange 30 is firmly joined in any convenient manner to the tube. Projecting from the outer side of the collar 28 is an annular shoulder 32 containing a threaded opening 34.

Intermediate member 14 comprises an externally threaded sleeve 36 which extends through and is threaded within the collar 26. The mating threads within the collar opening 34 and on the sleeve 36 together form the outer connecting means 20.

End member 18 comprises an eyebolt 37 having a shank 38 which extends centrally through the intermediate section sleeve 36. The inner end of the bolt shank 38 extends through and is threaded in a threaded opening 40 in the inner end of sleeve 36. The mating threads on the bolt shank and within the sleeve opening constitute the inner connecting means 22.

The outer connection plane referred to earlier is a plane passing through the outer threaded connection 20 approximately midway between the ends of the threaded opening 34 in collar 26 normal to the axis of tube 24. The inner connection plane is a plane passing through the inner threaded connection 22 approximately midway between the ends of the threaded sleeve opening 40 normal to the tube axis. The inner end of inner end member 16 is the center of tube 24. The outer end of outer end member 18 is the center of an opening 42 in the flattened outer end of the bolt.

From the foregoing description, it will be understood that the effective length of the intermediate member 14 equals the length of the threaded sleeve 36 between the two connection planes passing through the midpoints of the threaded connections 20 and 22. The effective length of the end member 16 equals the effective length of the tube 24 from its center to a plane passing through the midpoint of the collar flange 30 normal to the tube axis plus the effective length of collar 26 from the latter plane to the outer connection plane passing through the outer connecting means 20. The effective length of end member 18 equals the length of the eyebolt 37 from the inner connection plane passing through the inner connecting means 22 to the center of the eyebolt opening 42. It will be also understood that the effective length of the intermediate member 14 is adjustable by rotating the sleeve 36 to adjust it endwise relative to collar 26. The effective length of end member 18 is adjustable by rotating the eyebolt 37 to adjust the latter relative to sleeve 36.

Threaded on the outer end of sleeve 36 is a jam nut 44 which may be tightened against the shoulder 32 of collar 26 to lock the intermediate section 14 in adjusted position relative to the end section 16. Surrounding the bolt 18 within the sleeve 36 is a jam sleeve 46 which is threaded on the inner end of the bolt and adapted to be tightened against an internal shoulder 48 within the sleeve 36 to lock the end section 18 in adjusted position relative to the intermediate section. The outer end of the jam sleeve is accessible for rotation of the sleeve to tighten and release the latter.

Consider now the thermal response of each expansivity control means 12. First note that the three members 14, 16, and 18 form an essentially S-shaped thermally responsive structure. Thus, starting at the center of strut 10, the inner end member 16, comprising tube 24 and collar 20, extend outwardly to the outer connection plane passing through connecting means 20; the intermediate member 14, comprising sleeve 36, extends inwardly from the latter connection plane to the inner connection means 22; and the outer end member 18, comprising eyebolt 37, extends outwardly from the inner connection plane to the outer end of the strut. As a consequence, thermal expansion of the two end members increases the overall length of the expansivity control means while thermal expansion of the intermediate member reduces the overall length. Similarly, thermal contraction of the end members reduces the overall length, while thermal contraction of the intermediate member increases the overall length.

From the above discussion, it is evident that the net change in the overall length of each thermal expansivity control means 12 in response to a temperature change, i.e. the thermal expansivity of the control means is expressed as follows:

$$\Delta L = (a\alpha_a + b\alpha_b - c\alpha_c)\Delta T \quad (1)$$

where:
$\Delta L$ = thermal expansivity
$a$ = effective length of end member 16
$\alpha_a$ = thermal coefficient of member 16
$b$ = effective length of end member 18
$\alpha_b$ = thermal coefficient of member 18
$c$ = effective length of intermediate member 14
$\alpha_c$ = thermal coefficient of member 14
$T$ = temperature change As explained earlier, end member 16 is composed of two parts, namely tube 24 and collar 26, and its effective length is the sum of the effective length of the tube from its end plane to the midplane of the collar flange 30 and the effective length of the collar from its flange midplane to the outer connection plane. The effective length of the intermediate member 14 is the effective length of sleeve 36 between the inner and outer connection planes. The effective length of end member 18 is the effective length of bolt 37 from the inner connection plane to the bolt end plane. Accordingly, equation (1) above can be rewritten as follows:

$$\Delta L = (T\alpha_T + C\alpha_C + B\alpha_B - S\alpha_S)\Delta T \quad (2)$$

where:
$T$ = effective tube length
$\alpha_T$ = tube thermal coefficient
$C$ = effective collar length
$\alpha_C$ = collar thermal coefficient
$B$ = effective bolt length
$\alpha_B$ = bolt thermal coefficient
$S$ = effective sleeve length
$\alpha_S$ = sleeve thermal coefficient According to the present invention, the intermediate member 14 and end member 16 of each thermal expansivity control means 12 are constructed of materials having differing thermal coefficients. With this in mind, it will be evident from the preceding discussion and particularly from equations (1) and (2) that the overall thermal expansivity of each control means and hence also of the structure or strut 10 may be varied over a given range by adjustment of the intermediate member 14 of each control means relative to its end member 16 and/or adjustment of the respective end member 18 relative to the intermediate member to vary the effective length of either or both members 14 and 18. It will be further evident that the range of expansivity adjustment may be selected to encompass any desired expansivity values, including zero expansivity, by proper choice of the thermal coefficients.

By way of example, a strut according to the invention was constructed having a thermal expansivity adjustment range including zero expansivity. This strut was constructed of the following materials:

Eyebolts 18 — titanium
Tube 24 — graphite/epoxy
Collars 26 — titanium
Sleeves 36 — aluminum The thermal expansivity of the strut is adjustable by rotating and thereby adjusting one or both sleeves 36 relative to the tube 24 and/or rotating and thereby adjusting one or both eyebolts 18 relative to their sleeves to vary the effective lengths of the sleeves and/or bolts. It will be evident from equation (2) that the expansivity of the strut may be adjusted to zero by selection of the proper strut materials, such as those listed above. In this regard, it will be seen from equation (2) that such zero expansivity is attained by adjusting each end fitting to acheive the following relation:

$$S = (T\alpha_T + C\alpha_C + B\alpha_B)/\alpha_S \quad (3)$$

According to another feature of the invention, the overall length of the strut 10 is adjustable independently of its thermal expansivity and the thermal expansivity of the strut is adjustable independently of its length. To this end, the end fitting sleeves 36 and eyebolts 37 are provided with threads of the same pitch and, preferably, the threads of the two fittings are reversed relative to one another. As a consequence, the sleeves 36 may be adjusted independently of the overall length of the strut, that is without changing the overall length, by rotating the sleeves while holding the tube 24 and eyebolts 37 stationary. It is evident that such independent adjustment of each sleeve increases or decreases the effective sleeve length S and effective eyebolt length B by the same amount, depending upon the direction of sleeve rotation.

With regard to adjustment of the thermal expansivity of the strut independently of its overall length, it was just noted above that the end fitting sleeves 36 are adjustable without changing the overall length of the strut to vary the effective sleeve length S and eyebolt length B. It is further evident from equation (2) that this sleeve adjustment varies the quantity $B\alpha_B - S\alpha_S$ in the equation and thereby the strut $\Delta L$. Accordingly, it is clear that the strut end fittings 12 may be first adjusted to provide the strut with a desired overall length, after which the sleeves may be adjusted to vary the thermal expansivity without affecting the strut length. Adjustment of the strut length independently of its thermal expansivity is accomplished by adjusting the end fittings as desired to vary the strut length and following each length adjustment, adjusting the end fitting sleeves to the positions which yield the desired fixed expansivity.

I claim:

1. A controlled thermal expansivity structure comprising:
   first, second, and third elongate members aligned parallel to a common axis;
   first connecting means joining one end of said first member and one end of said second member for relative endwise adjustment of said latter members along said axis and securing said latter members against relative endwise thermal expansion and contraction at a fixed transverse plane of said first member;
   second connecting means joining the other end of said second member and one end of said third member for relative endwise adjustment of said latter members along said axis and securing said latter members against relative endwise thermal expansion and contraction at a fixed transverse plane of said second member;
   said first member extending from said one end toward said other end of said second member and said third member extending from said other end toward said one end of said second member;
   said second and third members having differing thermal coefficients; and
   said first and second members and said second and third members being independently relatively adjustable after assembly of the several members to adjust the overall length of said structure and to adjust selectively the effective coefficient of thermal expansion of said structure at any length within a given range of said length adjustment through a range including positive, negative, and zero coefficient values.

2. A structure according to claim 1 wherein:
   said structure is a load-bearing strut;
   said first member is a tube;
   said second member is a sleeve within said tube;
   said third member is a rod within said sleeve;
   said first connecting means comprises mating threads on said tube and sleeve; and
   said second connecting means comprises mating threads on said sleeve and rod.

3. A structure according to claim 2 wherein:
   the mating threads of said first and second connecting means have the same pitch.

4. A controlled thermal expansivity structure comprising:
   a first elongate member;
   second and third elongate members at each end of said first members;
   said members being aligned parallel to a common axis;
   first connecting means joining each end of said first member and one end of the respective second member for relative endwise adjustment of the latter members along said axis and securing the latter members against relative endwise thermal expansion and contraction at a fixed transverse plane of said first member passing through said connecting means;
   second connecting means joining the other end of each second member and one end of the respective third member for relative endwise adjustment of the latter members along said axis and securing the latter members against relative endwise thermal expansion and contraction at a fixed transverse plane of the second member passing through said second connecting means;
   each second member extending from the respective end toward the opposite end of said first member and each third member extending from said other end toward said one end of the respective second member;
   said second and third members having differing thermal coefficients; and
   said first and second members and said second and third members being independently relatively adjustable after assembly of the several members to adjust the overall length of said structure and to adjust selectively the effective coefficient of thermal expansion of said structure at any length within a given range of said length adjustment through a range including positive, negative, and zero coefficient values.

5. A structure according to claim 4 wherein:
   said structure is a load-bearing strut;
   said first member is a tube;
   said second members are sleeves within the tube ends;
   said third members are rods within said sleeves;
   said first connecting means comprise mating threads on said tube and sleeve; and
   said second connecting means comprise mating threads on said sleeves and rods.

6. A structure according to claim 5 wherein:
   the mating threads of said first and second connecting means have the same pitch.

7. A structure according to claim 6 wherein:
   the corresponding mating threads at the two ends of said tube are reversed relative to one another.

8. A load-bearing strut having controlled thermal expansivity comprising:
   a tube having an internally threaded portion at each end;
   an externally threaded sleeve threaded in and having a length exceeding each tube threaded portion;
   each sleeve having an internally threaded portion at its inner end;
   an eyebolt threaded within each sleeve threaded portion and an apertured outer end extending beyond the adjacent end of said tube and the outer end of the respective sleeve;
   said sleeves and bolts having differing thermal coefficients; and
   said tube and sleeves and said sleeves and bolts being independently relatively adjustable after assembly of said tube, sleeves and bolts to adjust the overall length of said strut and to adjust selectively the effective coefficient of thermal expansion of said strut at any length within a given range of said length adjustment through a range including positive, negative, and zero coefficient values.

9. A strut according to claim 8 wherein:

said threads have the same pitch and the threads at each end of said tube are reversed relative to the threads at the other tube end.

10. A strut according to claim 9 wherein:
said tube comprises a graphite filter reinforced epoxy tube having a substantially zero thermal coefficient;
said sleeves comprise aluminum sleeves; and
said eyebolts comprise titanium bolts.

* * * * *